April 21, 1936.    T. W. B. WATLING    2,038,069
COIN CONTROLLED APPARATUS
Filed Oct. 17, 1934    4 Sheets-Sheet 1

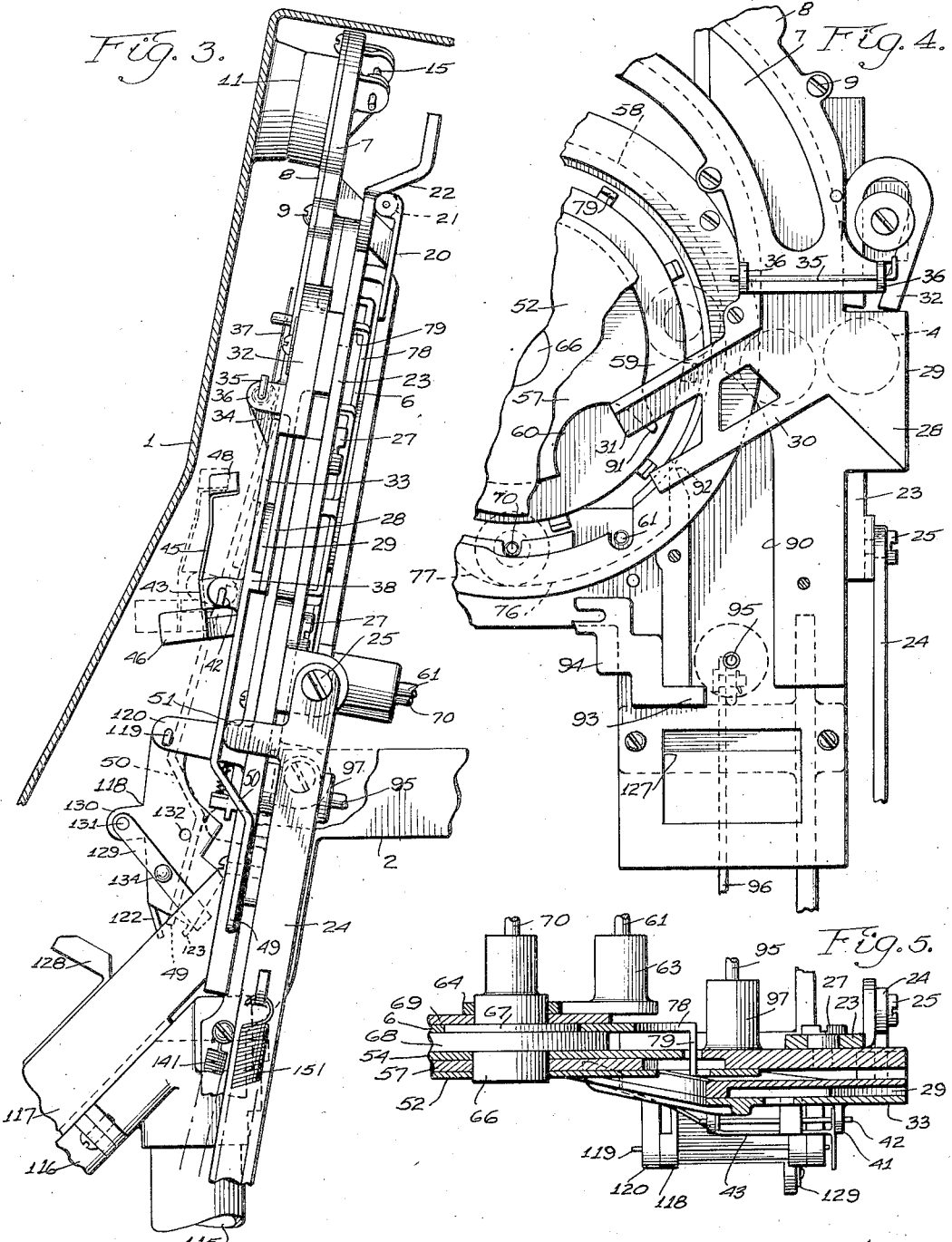

April 21, 1936.  T. W. B. WATLING  2,038,069
COIN CONTROLLED APPARATUS
Filed Oct. 17, 1934    4 Sheets-Sheet 3
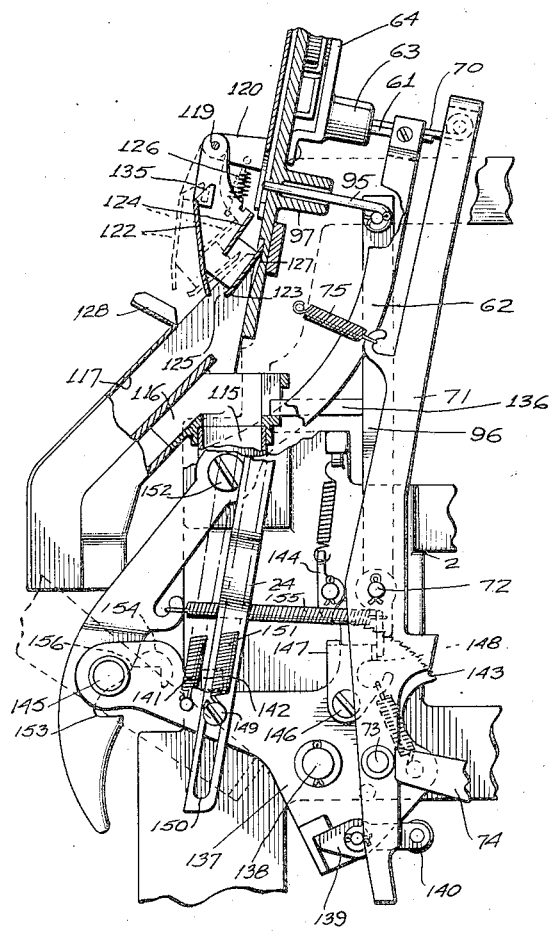
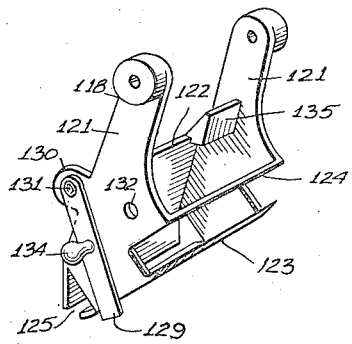
Witnesses
Arthur M. Franke,
Wm. E. Anderson.
Inventor
Thomas W. B. Watling.
By Fisher, Clapp, Soans & Pond
Attys.

April 21, 1936.   T. W. B. WATLING   2,038,069
COIN CONTROLLED APPARATUS
Filed Oct. 17, 1934   4 Sheets-Sheet 4

Witnesses
Arthur M. Franke
L. E. Anderson

Inventor
Thomas W. B. Watling
By Fisher, Clapp, Soans & Pond
Attys.

UNITED STATES PATENT OFFICE 2,038,069

COIN CONTROLLED APPARATUS

Thomas W. B. Watling, Chicago, Ill., assignor to Watling Manufacturing Company, Chicago, Ill., a corporation of Illinois Application October 17, 1934, Serial No. 748,593

4 Claims. (Cl. 194—97)

This invention relates to coin controlled mechanisms provided with a coin chute through which the coins, tokens, or slugs travel edgewise.

Usually, in devices of this class, an inserted token is arrested in a predetermined operative position in the chute to cooperate with suitable means for disabling a latch which controls the vending or other operating mechanism.

In coin chutes, the guideway is proportioned to permit the passage of a coin or token of the denomination for which the machine is constructed. The cross sectional area of the guideway is only sufficient to permit clearance of a coin of proper dimensions. If, therefore, as frequently occurs, a bent coin is inserted into the chute or two or more thin coins overlap in the guideway, the chute becomes clogged and the machine is rendered inoperative until the chute is cleared.

The main objects of this invention are to provide a coin controlled mechanism having improved means for releasing and ejecting any coins or tokens which might become wedged in the coin chute; to provide improved releasing means of this kind which will be automatically actuated upon each operation of the operating mechanism; and to provide improved separating means for separating the solid coins or tokens from the apertured tokens as they leave the chute.

An illustrative embodiment of this invention is shown in the accompanying drawings, wherein:

Figure 3 is a side elevation taken from the right of Figure 1 and showing also a portion of the machine casing.

Figure 4 is a fragmentary front elevation of the coin chute with the front hinged gate removed.

Figure 5 is a horizontal section taken on the line 5—5 of Figure 1.

Figure 6 is a fragmentary side elevation showing part of the operating mechanism and the selector or separator, certain parts being broken away for the sake of clearness.

Figure 7 is a fragmentary side elevation showing the deflector in an adjusting position.

Figure 8 is a perspective view of the coin deflector which forms a part of the separating mechanism.

Figure 1:
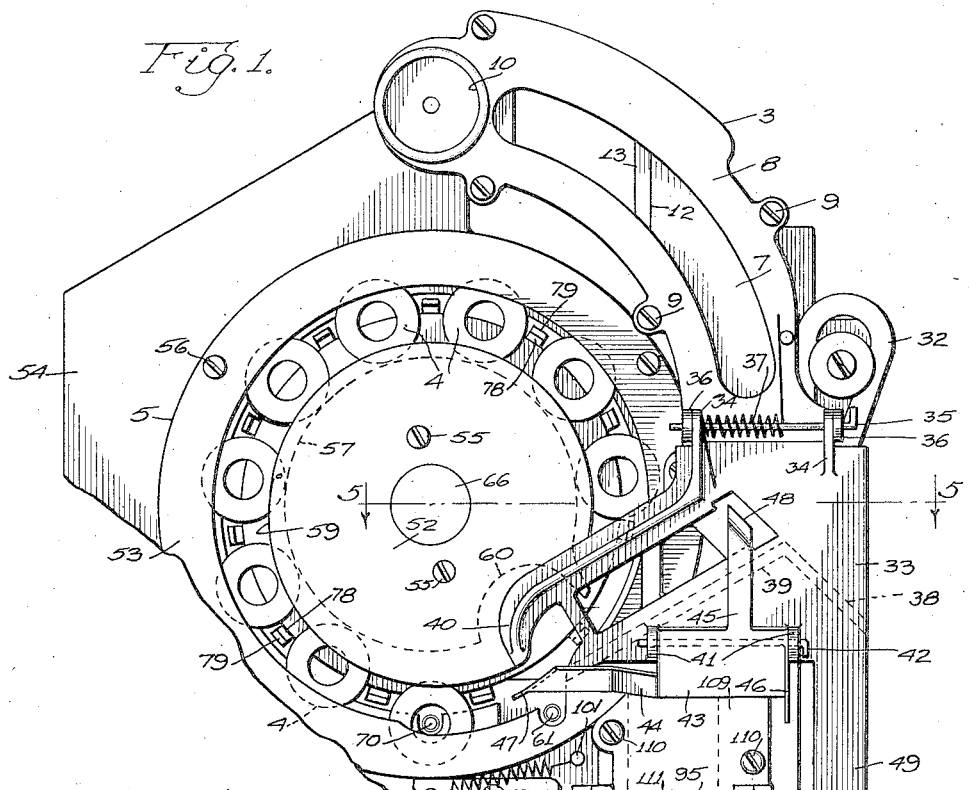
Figure 1 is a fragmentary front elevation showing the improved coin chute and part of the operating mechanism; the casing of the machine being omitted.
Figure 2:
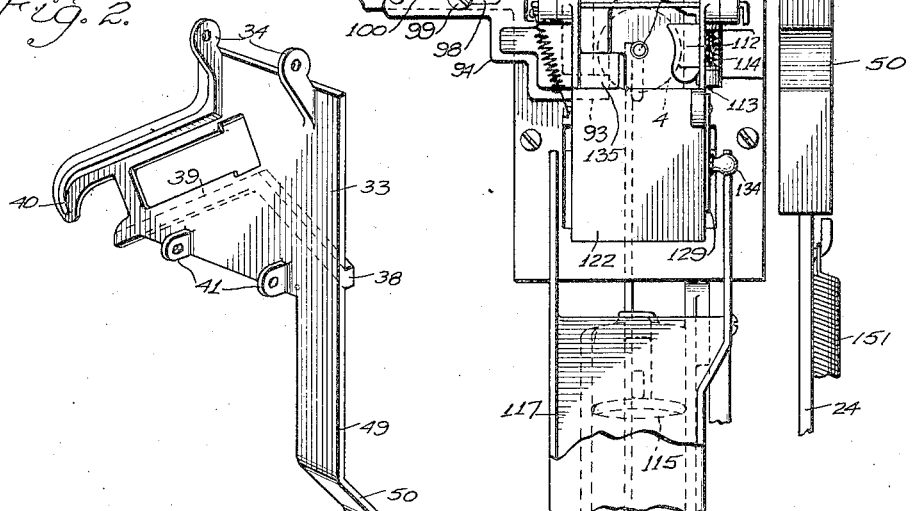
Figure 2 is a perspective view of the hinged gate supported at the lower end of the chute.

In the construction shown in the drawings, the invention is applied to one type of vending machine but it is to be understood that the invention is equally applicable to a large number of other types of coin controlled machines. The drawings illustrate only those portions of the vending machine which will be of assistance in describing the improvement.

In the form shown, the machine comprises a casing 1 in which is mounted a frame 2 which supports the coin chute and also certain parts of the operating mechanism.

The coin chute herein shown comprises an arcuate neck portion 3 which directs the slugs or coins 4 to a display portion 5 in which the coins are fed intermittently through a circular path for display purposes by means of a conveyer wheel 6 similar to that shown in my copending application Serial No. 735,935 filed July 19, 1934.

The neck 3 of the chute comprises a channel member 7 to which a face plate 8 is secured by screws 9 or other suitable fastening means. The upper end of the neck has the usual inlet 10 alined with an annular cup 11 of the front wall through which the coins are inserted.

Near the inlet 10, the channel member 7 has an opening 12 in which is located a hinged gate 13 having lugs 14 pivoted on a hinge pin 15 supported in lugs 16 on the rear face of the channel 7. The gate is normally held closed by a coin spring 17 embracing the hinge pin. The purpose of the hinged gate is to permit the ejection of any bent coins or slugs which may become lodged in the neck adjacent the inlet.

Formed on the hinged gate 13, is a lug 18 carrying a set screw 19 adapted to engage the rear face of the channel member 7 for limiting the forward movement of the gate under the action of the spring 17.

The gate 13 is automatically opened upon each operation of the operating mechanism. For this purpose, the gate has an arm 20 carrying a roller 21 which bears on a cam 22 formed on the upper end of a vertically reciprocable bar 23 to which is pivotally connected a link 24 by means of a pin 25. The link 24 is part of the operating mechanism and is depressed upon the slightest movement of the operating crank or handle so as to open the gate 13 for releasing any coin which might be jammed in the chute adjacent the inlet.

The bar 23 has slots 26 for receiving pins 27 mounted on the frame.

The coins which are ejected through the hinged gate, may be delivered to the top of the casing by means of a suitable return chute (not shown).

Formed on the lower end of the channel member 7, is an extension 28 forming the rear plate of a return chute 29, and another extension 30 forming the rear plate of a guideway 31 for directing the coins to the conveyer in the display zone. Iron slugs are deflected into the return chute by means of a magnet 32. This return chute and guideway have a front plate or gate 33 in common. This gate has ears 34 hinged to a pin 35 supported in lugs 36 formed on the plate 8. Embracing the pin 35 is a spring 37 having its ends bearing against the plate 8 and gate 33 for normally holding the gate in closed position. Formed on the rear face of the gate 33, are ribs 38 and 39 forming the lower inclined edges of the return chute 29 and guideway 31, respectively.

A curved nose 40 formed on the gate 33 serves to direct the coins into the path of the conveyer.

Formed on the front face of the gate 33 is a pair of lugs 41 supporting a hinge pin 42 on which is hinged a deflector 43 having a pair of arms 44 and 45 and a counter weight 46. On the outer end of the arm 44 is a cam 47 adapted to normally extend into the coin path so as to be shifted outwardly by a coin in the so-called operative position.

On the outer end of the arm 45 is an inclined shoulder 48 adapted to be projected into the coin path for stopping a subsequently inserted coin which is thereby caused to roll into the return chute 29 if a previously inserted coin is still in the operative position. The counter-weight normally holds the deflector in the position shown in full lines in Fig. 3.

Depending from the gate 33 is an arm 49 having a cam portion 50 adapted to engage a lug 51 on the link 24 for automatically opening the gate 33 upon each operation of the operating mechanism. When the gate 33 is opened, any coins or slugs which may have been jammed in the lower part of the chute will be released.

In the form shown, the display portion 5 of the chute comprises concentric plates 52 and 53 secured to a rear supporting plate 54 by screws 55 and 56, respectively. The concentric plates 52 and 53 are spaced from the plane of the rear plate 54 by a spacer disk 57 and an annular flange 58, respectively, so as to provide an annular guideway 59 through which the coins or slugs are moved by conveyer. The plate 52 is of greater diameter than the spacer 57 and the plate 53 overhangs the inner edge of the flange 58 so as to form the front wall of the guideway 59. The flange 58 is preferably integral with the plate 54.

The plane of the guideway 59 is offset from the plane of the neck portion 3 of the chute, and the coins are directed into the plane of the guideway by the curved nose 40 of the hinged gate 33. Adjacent the deflector nose 40, the spacer 57 is notched as shown at 60 to permit the coins to enter the guideway where they engage the conveyer.

The first position in the guideway 59 which the coin occupies is the so-called operating position because in this position the coin cooperates with a plunger 61 carried on the upper end of a latch bar 62 which controls the operating mechanism, as hereinafter described.

The plunger 61 is slidable in a bearing 63 formed on a bracket 64 which is secured to the rear face of the plate 54 by screws 65. Supported in this bracket is a hub 66 which extends through the plates 52 and 54 and spacer 57. This hub has a flange 67 for rotatably supporting the conveyer 6 and a flange 68 which spaces the body of the conveyer from the rear plate 54. A washer 69 is interposed between the conveyer and the bracket 64.

When there is no coin in the first station or operating position, and an attempt is made to operate the machine, the plunger 61 moves forwardly through notches in the rear and front plates, for locking the machine. From an examination of Figures 1 and 4, it will be seen that the latch plunger 61 is positioned so as to engage each coin near the edge thereof so that both solid coins and apertured slugs or tokens may release the latch of the operating mechanism, as is well understood.

In the second station of the display zone, the solid coins coact with a plunger 70 carried on the upper end of a lever 71 which is pivotally secured to the frame 2 by a pin 72. The lower end of the lever 71 has a roller 73 co-acting with a member 74 of the vending mechanism, as is well understood in the art, so that, when a solid coin is present in the second station of the chute, the operator may obtain a stick of gum, piece of candy or the like from the vending magazine, not shown. The roller 73 is held in contact with the member 74 by a spring 75 connected to the frame 2 and lever 71. Inasmuch as the specific form of vending machine forms no part of this invention, further details thereof have been omitted. The pin or plunger 70 is positioned centrally of the coin or slug, and, therefore, if there is an apertured slug or token in the second station, the plunger 70 will pass through such token without operating the vending mechanism.

In order to permit the plungers 61 and 70 to enter the guideway 59 without interfering with the operation of the conveyer, these plungers are positioned below the path of the conveyer. For this reason, the inner edge of the annular flange 58 is cut away adjacent the plungers 61 and 70, as shown at 76, so as to support the coins at the proper level for coaction with the plungers. As shown in Figure 4, the coins ride up an inclined runway 77 when leaving the recess 76. In order to permit inspection of all of the coins in the display zone, a window (not shown) is placed in the front wall of the casing directly in front of the annular guideway 59.

In the form shown, the conveyer wheel 6 comprises a metal stamping having radially disposed arms 78 provided with forwardly extending fingers 79 which project through the guideway 59 for engagement with the coins. The fingers 79 are disposed centrally of the guideway so as to engage the rims of the coins at substantially the center thereof, except when the coin is located in the recess 76. This conveyer moves all of the coins in the display zone one step upon each operation of the machine.

The conveyer is intermittently actuated by the operating bar 23 which is connected to the link 24 of the operating mechanism. Formed on the bar 23, is an arm 80 having a pivot pin 81 which supports a detent 82 which is adapted to be carried downwardly into engagement with an arm 78 of the conveyer wheel for rotating the conveyer one step. The detent is normally held against a stop 83 on the arm 80 by means of a spring 84 which permits the detent to pivot on the upstroke of the bar 23. A stop 85 on the plate 54 limits the down stroke of the detent.

In order to prevent reverse movement of the conveyer wheel and also for the purpose of properly positioning the conveyer after each operation, the conveyer has circumferential pockets 86 coacting with a pawl 87 which is pivotally secured to the plate 54 by a pin 88. A spring 89 holds the pawl 87 in yielding engagement with the conveyer.

Formed in the front face of the plate 54, is a vertical channel 90 into which each coin is ejected after it is conveyed through the annular guideway 59. Extending into the guideway 59 adjacent the channel 90, are two oppositely disposed projections 91 and 92 which are adapted to disengage each coin from the conveyer to permit the coin to drop into the channel 90. The projection 91 is formed on the disk 57 adjacent the notch 60 and the oppositely disposed projection 92 is formed on the plate 54.

Each coin which drops into the channel 90 is adapted to be detained at the lower end of the channel by a lug 93 on one end of a retractable bar 94 to permit selection by a selector pin 95 which is carried on the upper end of a lever 96 pivotally mounted on the pin 72. The pin 95 is slidable in a boss 97 on the rear face of the plate 54 and is adapted to be projected forwardly through an aperture in said plate so as to enter the channel 90 upon each operation of the device. The purpose of this selector pin is to separate the solid coins from the apertured slugs or tokens.

The bar 94 has longitudinally extending slots 98 for receiving pins 99 mounted on the front face of the plate 54 to permit the lug 93 to move into and out of its operative position. The bar 94 is yieldingly held in its operative position, as shown in Figures 1 and 4, by a spring 100 connected at one end to the bar and at its other end to a pin 101 on the plate 54. When it is desired that all coins should drop through the lower end of the channel 90 without selection, the bar 94 is retracted by disconnecting the spring 100 from the pin 101.

On the end of the bar 94 is an arm 102 having a lug 103 projecting rearwardly through an opening 104 in the plate 54 for engagement with a bell crank 105 which is pivotally secured to the plate 54 by a pin 106. One arm of the bell crank is held in the path of the teeth or arms of the conveyer 6 by means of a spring 107 connected to the bracket 64. Movement of the bell crank under the action of the spring 107 is limited by a stop 108 mounted on the plate 54. With this construction, upon each movement of the conveyer, the bell crank 105 retracts the bar 94 for moving the lug 93 away from the channel 90 so as to permit a slug or token to drop through the lower end of the channel.

The channel 90 has a front plate 109 secured thereto by screws 110. Formed in this front plate adjacent the lower end thereof, is an opening 111 through which the solid coins may be ejected by the plunger 95. Adjacent the opening 111 is a hinged gate 112 secured to the plate 109 by a pin 113 and which is yieldingly urged by a spring 114 into position to prevent the coin from accidentally falling through the opening 111. The gate 112, however, yields under the action of the plunger 95.

Located below the channel 90 are three receiving magazines 115, 116 and 117. The magazine 115 is located in alinement with the channel 90 so that, in the absence of any deflecting means, all coins and tokens falling from the channel 90 would drop directly into the magazine 115.

However, it is desirable to separate the solid coins from the apertured tokens by directing them into separate magazines. This is accomplished by a deflector member 118 which is hinged on a pin 119 supported in lugs 120 on the plate 109.

The deflector comprises a pair of side plates 121, a front plate 122, rear plate 123 and intermediate plate 124 defining a hopper having an outlet opening 125. A spring 126 is connected to the deflector and to one of the lugs 120 for normally urging the deflector to the innermost position, shown in full outline in Fig. 6, so as to position the upper edge of the rear plate 123 within a recess 127 formed in the plate 54.

When the deflector occupies the full line position shown in Fig. 6, apertured coins which fall through the channel 90 will be deflected into the magazine 117 by the rear plate 123. Solid coins, which are ejected by the plunger 95, will pass between the plates 122 and 124 and drop into the magazine 115.

However, it may be desirable to direct apertured coins into the magazine 115 and solid coins into the magazine 117. This is accomplished by shifting the deflector to the dotted line position of Fig. 6, which is the position shown in Fig. 7. In this position, the apertured coins falling from the channel 90 drop directly into the magazine 115 without being touched by the deflector. The solid coins which are ejected by the plunger 95 pass between the plates 122 and 124 which direct them into the forward magazine 117. A ledge 128 on the forward upper edge of the magazine 117 prevents the coins from accidentally jumping over the magazine. In the position of the deflector shown in Fig. 7, no coins will pass between the deflector plates 123 and 124.

The deflector is held in the adjusted position, shown in Fig. 7, by an arm 129 which is pivotally secured to a lug 130 on the deflector by means of a pin 131. The free end of the arm 129 is adapted to bear against the plate 54, as shown in Fig. 7, for holding the deflector against the action of the spring 126.

Formed in one of the side plates 121 of the deflector, is a pair of apertures 132 and 133 for receiving a retractable pin 134 mounted on the arm 129 to lock the arm in either of its two positions, as shown in Figs. 7 and 8.

When the solid coins are ejected by the plunger 95, they may have a tendency to drop flatwise into the deflector which might cause the coins to become jammed between the plates 122 and 124. To prevent this, the upper edge of the plate 122 has a rearwardly projecting part 135 which serves to turn the coins so as to cause them to drop edgewise.

Located above the magazine 115 is a reciprocable pusher 136 mounted on the lever 96. When the magazine 115 is filled, the pusher 136 pushes subsequent coins from the top of the stack into the intermediate magazine 116.

In the form shown, the operating mechanism comprises a bell crank lever 137 pivotally secured to the frame 2 by a pin 138. On the bell crank 137 is a pivoted finger 139 which carries a roller 140 adapted to actuate part of the mechanism (not shown). A spring 141 connected to the bell crank 137 and frame 2 normally holds the bell crank in its retracted position against a stop 142.

Formed on the lever 137 is a full stroke ratchet 143 adapted to cooperate with a pivoted, spring held dog 144 on the frame 2 to compel a complete shift of the lever before it returns to normal position. Mounted on the forward end of the lever 137 is a pin 145 adapted to cooperate with actuating means which may be similar to that shown in the patent of Burns S. Watling, No. 1,990,719, issued February 12, 1935.

Pivotally secured to a pin 146 on the bell crank 137 is a spring-pressed dog 147 having a shoulder 148 adapted to engage the lower end of the lever 96 for shifting the selector pin 95 forwardly upon the up-stroke of the bell crank lever 137.

Mounted on the lever 137 is a pin 149 extending through a slot 150 in the link 24. A spring 151 is connected to the pin 149 and link 24 for holding the link in the position shown in Figure 6.

The operating mechanism is normally locked by the latch bar 62 which is pivotally secured to the frame 2 by a pin 152. Formed in the rear edge of the latch bar 62 is a notch 153 for receiving a lug 154 on the bell crank 137 to prevent a complete stroke of the bell crank when the latch has not been disabled by a proper coin. The latch bar is normally urged toward its locking position by a spring 155 connected to the lower end of the lever 96. This spring also serves to retract the selector pin 95 when the lever 137 is depressed.

Formed on the inner edge of the latch bar 62 is a cam portion 156 adapted to coact with the lug 154 for holding the latch retracted, as shown in Figure 6, when the lever 137 is moved to its starting position. The construction is such that the latch permits a limited movement of the lever 137 without the use of a coin, i. e., the lever 137 may move until the lug 154 rides into the notch 153. To permit a complete stroke of the lever 137 the latch must be retained in its retracted position against the action of the spring 155. This is accomplished by the engagement of the plunger 61 with a coin in the first station of the display chute.

In operation, a coin which is inserted through the inlet 11 drops through the channel 7 and is deflected by the deflectors 39 and 40 into the operating position or first station of the annular display guideway 59. In the first station of the guideway, the coin is positioned directly opposite the pin or plunger 61. If there is no coin of proper size in the first station of the display zone, and an attempt is made to actuate the bell crank 137, the lug 154 rides into the notch 153 and the spring 155 rocks the latch bar 62 thereby shifting the forwarding end of the plunger 61 through the path of the coins. However, if a coin of proper size is arrested in the first station of the display zone, it will stop the plunger 61 so as to prevent the latch bar 62 from being shifted into the path of the lug 154, and the operative stroke of the lever 137 may then be completed.

Figure 9:
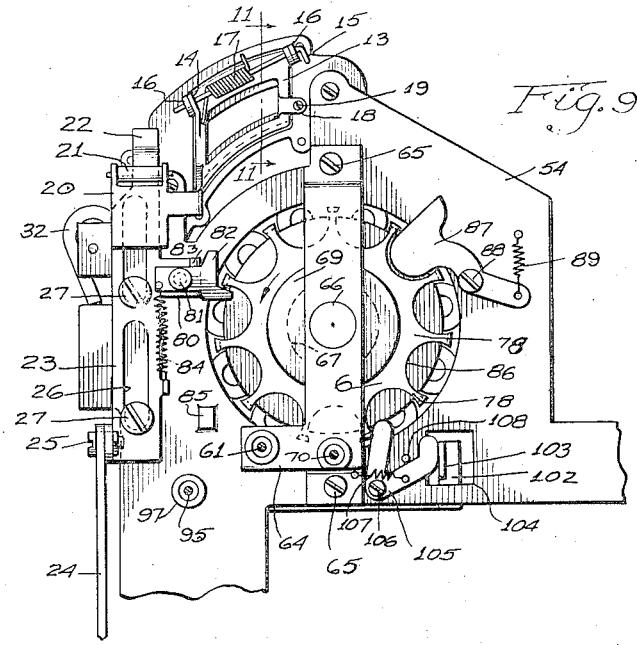
Figure 9 is a fragmentary rear elevation of the coin chute and rotary conveyor.
Figure 10:
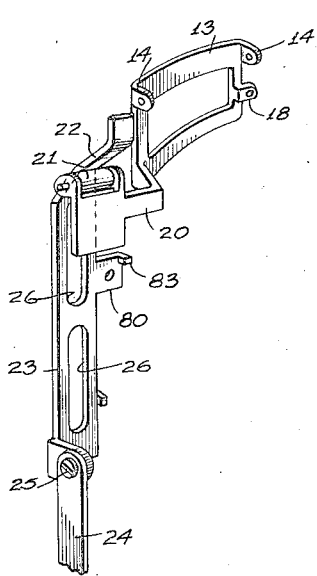
Figure 10 is an enlarged perspective of the uppermost hinged gate and its actuator.
Figure 11:
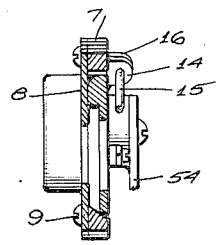
Figure 11 is a transverse section taken on the line 11—11 of Figure 9.

Upon the down stroke of the elever 137 the link 24 is depressed so as to move the detent 82 downwardly for rotating the conveyer 6 one step in the direction of the arrow shown in Figure 9 or clockwise as shown in Figure 1. When the conveyer is rotated one step, the coin opposite the latch control pin 61 is advanced to the second station which is directly opposite the vending pin 70. If an apertured token or slug is positioned in the second station, when the vending pin 70 moves forwardly it will merely pass through the aperture in the token and will not actuate the vending mechanism. However, if a solid coin is positioned opposite the vending pin 70, it will stop the forward movement of the vending pin so as to cause the operation of the vending mechanism not shown.

Upon the next step of the conveyer 6, the coin or token is advanced from the vending position and rides up the incline 77.

Upon every operation of the bell crank 137, the link 24 is depressed, which opens the gate 13 through the cam 22 which engages the roller 21 and the gate 33 is also opened through the lug 51 which engages the cam 50. When the gates 13 and 33 are automatically opened upon each operation of the machine, any coins which may have become jammed in the chute will be ejected from the guideway.

When the foremost coin in the conveyer 6 reaches the projections 91 and 92, it is deflected laterally and rolls into the channel 90 where it comes to rest on the lug 93 of the bar 94. On the up-stroke of the bell crank lever 137, the shoulder 148 of the dog 147 strikes against the lower end of the lever 96 and projects the selector pin 95 forwardly through the channel 90. If there is a solid coin at the bottom of the channel 90, the forwardly moving selector pin 95 will strike such coin and will eject the coin from the channel. If, however, an apertured token is resting at the bottom of the channel 90, the forwardly moving selector pin 95 will merely pass through the aperture in the token and such token will drop through the lower open end of the channel 90 when the bar 94 is retracted through the operation of the bell crank 105.

The coins and apertured tokens ejected from the channel 90 will be separated and directed into the proper receiving magazines by the improved deflector 118 as hereinbefore described.

Although but one specific embodiment of this invention has been herein shown and described, it will be understood that details of the construction shown may be altered without departing from the spirit of my invention as defined by the following claims.

I claim:

1. A device of the class described comprising coin-controlled operating mechanism, a coin chute having an inlet and an outlet, releasable means for arresting an inserted coin in operating position between said inlet and outlet, said chute having an auxiliary outlet in one side thereof between said inlet and said arresting means to permit the release of coins which may be jammed prior to reaching operating position, a movable gate normally closing said auxiliary outlet, means for opening said gate, a coin return chute, and a deflector hinged on said gate and controlled by an arrested coin in operating position, said deflector having a part movable into said first mentioned chute to stop a subsequently inserted coin and to direct the same into said return chute.

2. A device of the class described comprising coin-controlled operating mechanism, a coin chute having an inlet and an outlet, releasable means for arresting an inserted coin in operating position between said inlet and outlet, said chute having an auxiliary outlet in one side thereof between said inlet and said arresting means to permit the release of coins which may be jammed prior to reaching operating position, a movable gate normally closing said auxiliary outlet, a coin return chute, a deflector hinged on said gate and controlled by an arrested coin in operating position, said deflector having a part movable into said first mentioned chute to stop a subsequently inserted coin and to direct the same into said return chute, and means actuated by said operating mechanism for opening said gate.

3. A device of the class described comprising coin controlled operating mechanism, a coin chute having a display zone, a conveyer for moving the inserted coins through said display zone, said chute having an auxiliary outlet located adjacent its inlet end and a second auxiliary outlet located adjacent said display zone to permit the release of coins which may be jammed prior to reaching said conveyer, a pair of gates hinged on said chute for controlling said auxiliary outlets, and means actuated by said operating mechanism for opening said gates upon each operation of said mechanism.

4. A device of the class described comprising a coin controlled operating mechanism having a reciprocable bar, a coin chute having a display zone, a conveyer for moving the inserted coins through said display zone, said chute having an auxiliary outlet located adjacent its inlet end and a second auxiliary outlet located adjacent said display zone to permit the release of coins which may be jammed prior to reaching said conveyer, a pair of separate gates hinged on said chute for controlling said auxiliary outlets, springs normally closing said gates, and cams on said bar for opening said gates upon each operation of said mechanism.

THOMAS W. B. WATLING.